(12) United States Patent
Imaoka (10) Patent No.: US 11,269,117 B2
(45) Date of Patent: Mar. 8, 2022

(54) PROJECTION DISPLAY APPARATUS

(71) Applicant: Konica Minolta, Inc., Tokyo (JP)

(72) Inventor: Masayuki Imaoka, Izumiotsu (JP)

(73) Assignee: KONICA MINOLTA, INC., Tokyo (JP)

( * ) Notice: Subject to any disclaimer, the term of this patent is extended or adjusted under 35 U.S.C. 154(b) by 903 days.

(21) Appl. No.: 16/071,011

(22) PCT Filed: Feb. 6, 2017

(86) PCT No.: PCT/JP2017/004241
§ 371 (c)(1),
(2) Date: Jul. 18, 2018

(87) PCT Pub. No.: WO2017/141753
PCT Pub. Date: Aug. 24, 2017

(65) Prior Publication Data
US 2021/0072433 A1 Mar. 11, 2021

(30) Foreign Application Priority Data
Feb. 15, 2016 (JP) .............................. JP2016-025719

(51) Int. Cl.
*G03B 21/00* (2006.01)
*G02B 5/00* (2006.01)
*G02B 26/02* (2006.01)

(52) U.S. Cl.
CPC .............. *G02B 5/005* (2013.01); *G02B 26/02* (2013.01); *G03B 21/008* (2013.01)

(58) Field of Classification Search
CPC .... G03B 21/008; G03B 21/28; G03B 21/142; G03B 21/145; G03B 21/208;
(Continued)

(56) References Cited

U.S. PATENT DOCUMENTS

| 2010/0118213 A1* | 5/2010 | Kato | ...................... G03B 21/20 348/750 |
| 2015/0042564 A1* | 2/2015 | Shiina | .................... G03B 17/54 345/158 |
| 2017/0010459 A1* | 1/2017 | Sawai | ...................... H04N 5/74 |

FOREIGN PATENT DOCUMENTS

| JP | 2003-322822 A | 11/2003 |
| JP | 2006-308992 A | 11/2006 |
| (Continued) | | |

OTHER PUBLICATIONS

International Search Report for corresponding International Application No. PCT/JP2017/004241, dated Mar. 14, 2017 (4 pages).
(Continued)

*Primary Examiner* — Sultan Chowdhury
(74) *Attorney, Agent, or Firm* — Osha Bergman Watanabe & Burton LLP (57) ABSTRACT

A projection display apparatus includes a reflective image display element having an image display surface including micromirrors, a prism unit bending an optical path of illumination light and transmitting image light, and a projection optical system. The prism unit has an air gap tilted with respect to a principal ray of the image light emitted from the center of the image display surface, and the image light passes through the air gap. The projection optical system includes an aperture stop with a noncircular aperture so shaped that part of a circular aperture in a peripheral portion thereof is cut off in a shape of a segment to serve as a shade portion, and image light corresponding to an end portion at a side where an incidence angle with respect to the air gap is large in an F-number beam is blocked by the shade portion satisfying predetermined conditions.

4 Claims, 9 Drawing Sheets

(58) Field of Classification Search
CPC ............ G03B 21/2013; G03B 21/2033; G03B 21/2053; G02B 5/005; G02B 5/3058; G02B 6/00; G02B 6/02; G02B 6/34; G02B 6/353
See application file for complete search history.

(56) References Cited

FOREIGN PATENT DOCUMENTS

| JP | 2013-037044 A | 2/2013 |
|---|---|---|
| WO | 2011108077 A1 | 9/2011 |
| WO | 2015/129849 A1 | 9/2015 |

OTHER PUBLICATIONS

International Preliminary Report on Patentability for corresponding International Application No. PCT/JP2017/004241, dated Aug. 30, 2018 (13 pages).
DLP(R) TRP pixel architecture and chipsets, Pico Display—Overview, Retrieved from Internet on Oct. 8, 2018 from DLP products URL; http://www.ti.com/lsds/ti/dlp/video-and-data-display/trp-technology.page#0.2 (2 pages).
Texas Instruments; "DLP Technology for Near Eye Display Application Report"; DLPA051A; Sep. 2014, Revised Aug. 2017 (18 pages).
Texas Instruments; "Getting Started with TI DLP Display Technology Application Report"; DLPA059B; Jan. 2015, Revised Aug. 2017 (19 pages).
Office Action issued in the counterpart Japanese Patent Application No. 2018-500047, dated Oct. 27, 2020 (6 pages).

\* cited by examiner

PROJECTION DISPLAY APPARATUS

The present U.S. patent application is a U.S. national phase application under 35 U.S.C. § 371 of International Application No. PCT/JP2017/004241 filed on Feb. 6, 2017. This application claims a priority, under the Paris Convention, to Japanese Patent Application No. 2016-025719 filed on Feb. 15, 2016, the entirety of which is incorporated herein by reference.

TECHNOLOGICAL FIELD

The present invention relates to a projection display apparatus, and for example relates to a projection display apparatus equipped with a reflective image display element (or unit) such as a digital micromirror device.

BACKGROUND

In a projector employing a DLP (digital light processing; a registered trademark of Texas Instruments Inc., USA) method, image projection is performed using an optical semiconductor called a DLP chip, in which millions of small mirrors (micromirrors) are incorporated. In a 3-chip DLP method in which three DLP chips are used, a special prism is used to separate lamp light into the three primary RGB colors of light to respectively illuminate the DLP chips to display a color image. In a 1-chip DLP method in which one DLP chip is used, a single color wheel divided into sections of three RGB colors is used to separate lamp light into the three primary RGB colors of light to illuminate the one DLP chip to display a color image. The color wheel rotates at a high speed, in accordance with which each micromirror is switched on/off at a high speed, and this produces afterimage effect on human eyes for them to see a color image in which the RGB colors are combined by the afterimage effect.

Digital micromirror devices, represented by the DLP chip described above, are widespread as reflective image display elements for use in projectors. A digital micromirror device has an image display surface which includes a plurality of minute micromirrors, and controls the tilt of each mirror surface on the image display surface, to modulate the intensity of illumination light and thereby form an image. Specifically, switching on and off of each pixel of the digital micromirror device is expressed by ±12° rotation of each mirror surface about a rotational axis at an angle of 45° with respect to each side of the image display surface (in other words, micromirror drive with respect to one axis), for example. As for movement of micromirrors, a digital micromirror device of a new operation type (Tilt & Roll Pixel DMD) that drives micromirrors with respect to two axes orthogonal to each other is also suggested in Non-Patent Document 1 listed below.

Various types of projection display apparatuses (see Patent Documents 1 to 3, for example) have conventionally been proposed as projectors having mounted thereon a reflective image display element such as the digital micromirror device described above, and also, there is a demand for bright and high-resolution projectors.

PATENT DOCUMENT

Patent Document 1: Japanese Patent Application Publication No. 2003-322822
Patent Document 2: Japanese Patent Application Publication No. 2006-308992
Patent Document 3: Japanese Patent Application Publication No. 2013-37044

NON-PATENT DOCUMENT

Non-Patent Document 1: DLP(R) TRP pixel architecture and chipsets, available on the Internet <URL: http://www.ti.com/lsds/ti/dlp/video-and-data-display/trp-technology.page#0.2>

Unfortunately, however, in conventional projection display apparatuses using a reflective image display element, an air gap provided for totally reflecting illumination light and directing the illumination light to an image display element causes image deterioration (flare) in transmitted image light. Thus, under the existing circumstances, there is a limit to improvement of resolution.

For example, in the projection display apparatuses disclosed in Patent Documents 1 and 2, for improvement of contrast, an aperture stop disposed in a projection optical system is so shaped as to block interfering portions of image light and undesired light (that is, undesired light regularly reflected on the digital micromirror device or a prism surface to enter the projection optical system). In the projection display apparatus disclosed in Patent Document 3, for the purpose of reducing the degradation of imaging performance, there is provided correction means having a shape asymmetric with respect to the optical axis of a lens unit. However, none of the projection display apparatuses disclosed in Patent Documents 1 to 3 is designed with consideration given to the flare caused when image light passes through an air gap, and thus none of them has a configuration where it is possible to improve image quality by blocking a flare component.

SUMMARY

One or more embodiments of the present invention provide a projection display apparatus with an improved image quality achieved by blocking a flare component generated in a prism unit.

According to one or more embodiments of the present invention, a projection display apparatus includes a reflective image display element which converts illumination light into image light by reflection on an image display surface and emits the image light, a prism unit which performs bending of an optical path of illumination light and transmission of image light, and a projection optical system which projects image light having passed through the prism unit onto a screen, wherein the image display surface includes a plurality of micromirrors, and an image is formed by modulating an intensity of illumination light by subjecting a tilt of each micromirror surface to ON/OFF control in the image display surface, the prism unit has an air gap tilted at a predetermined angle with respect to a principal ray of image light emitted from a center of the image display surface, and the image light passes through the air gap, the projection optical system has an aperture stop with a noncircular aperture so shaped that part of a circular aperture in a peripheral portion thereof is cut off in a shape of a segment to serve as a shade portion, and image light corresponding to an end portion at a side where an incidence angle with respect to the air gap is large in an F-number beam is blocked by the shade portion, and conditional formulae (1) to (3) below are satisfied:

$$0.85 \times Cg < G < 1.15 \times Cg \quad (1)$$

$$(0.1 \times T/P - 0.1) < S < (0.4 \times T/P + 0.1) \quad (2)$$

$$(0.25 - 0.07 \times F) < S < (1 - 0.2 \times F) \quad (3)$$

where, assuming that a plane including a principal ray of illumination light immediately before becoming incident on the center of the image display surface and a principal ray of image light immediately after the reflection is a reference plane, $$Cg = \arcsin(1/N) - (R - \arcsin(1/(2F)))/N,$$

N represents a d-line refractive index of a prism through which image light passes, R represents an angle (in degree) which a principal ray of illumination light immediately before becoming incident on the center of the image display surface and a principal ray of image light immediately after being reflected on the center of the image display surface form therebetween when projected on the reference plane, F represents a minimum F-number of the projection optical system, G represents an angle (in degree) of an air gap with respect to a plane perpendicular to a principal ray of image light emitted from the center of the image display surface, T represents an air-gap thickness (in mm), P represents a distance (in mm) between centers of micromirror surfaces located adjacent to each other, and S represents a shading ratio constituting the noncircular aperture of the aperture stop (S=[a width of the shade portion in a radial direction of the segment]/[a radius of the circular aperture]), S>0.

According to one or more embodiments of the present invention, a flare component generated as a result of image light passing through an air gap in a prism unit is blocked by a distinctive aperture stop provided in a projection optical system. Accordingly, it is possible to improve the image quality by blocking the flare component generated in the prism unit and thus to achieve a bright and high-resolution projection display apparatus.

BRIEF DESCRIPTION OF THE DRAWINGS

Certain advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to the disclosed embodiments. And such parts as are identical or equivalent among different embodiments are identified by common reference signs, and overlapping description will be omitted unless necessary.

Figure 1:
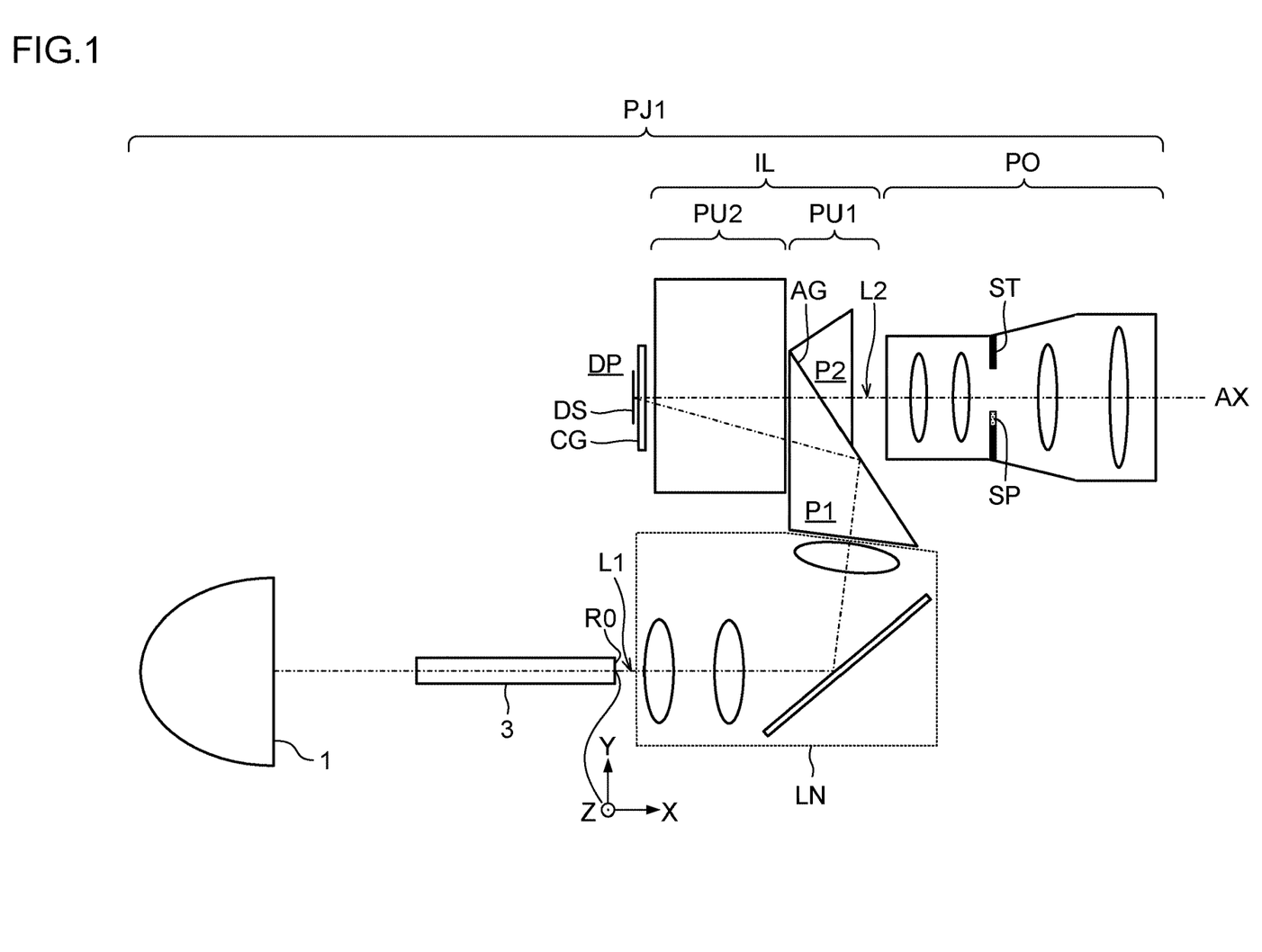
FIG. 1 is a schematic configuration diagram showing one or more embodiments of a projection display apparatus.
Figure 2:
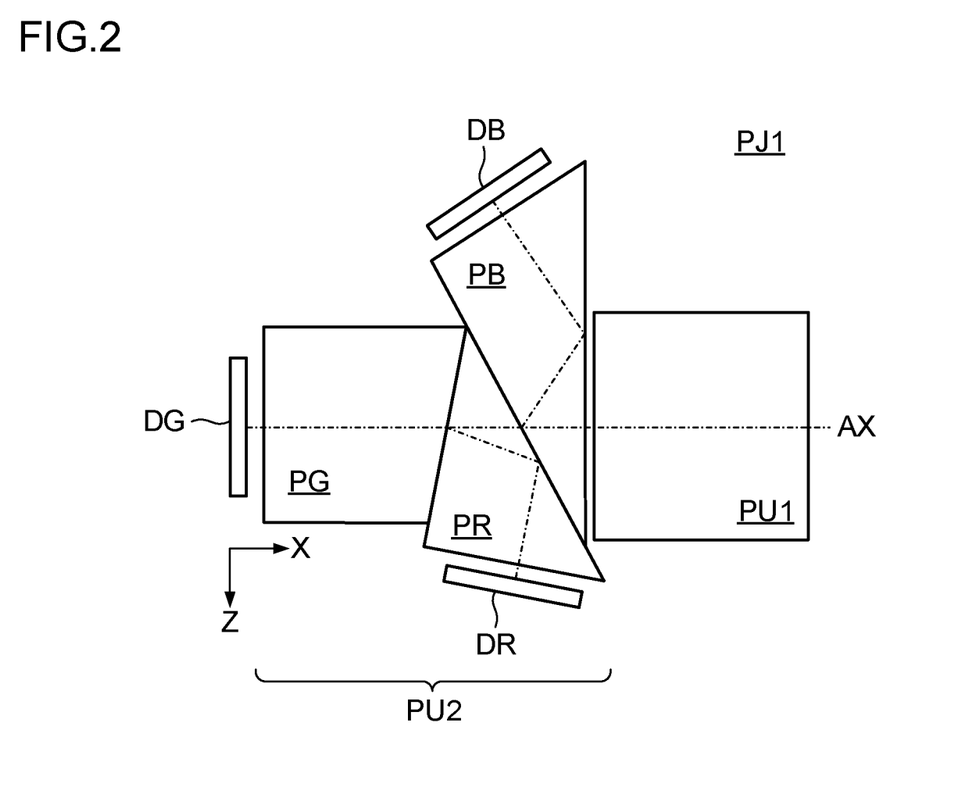
FIG. 2 is a top view showing an example of a principal part of one or more embodiments.
Figure 3:
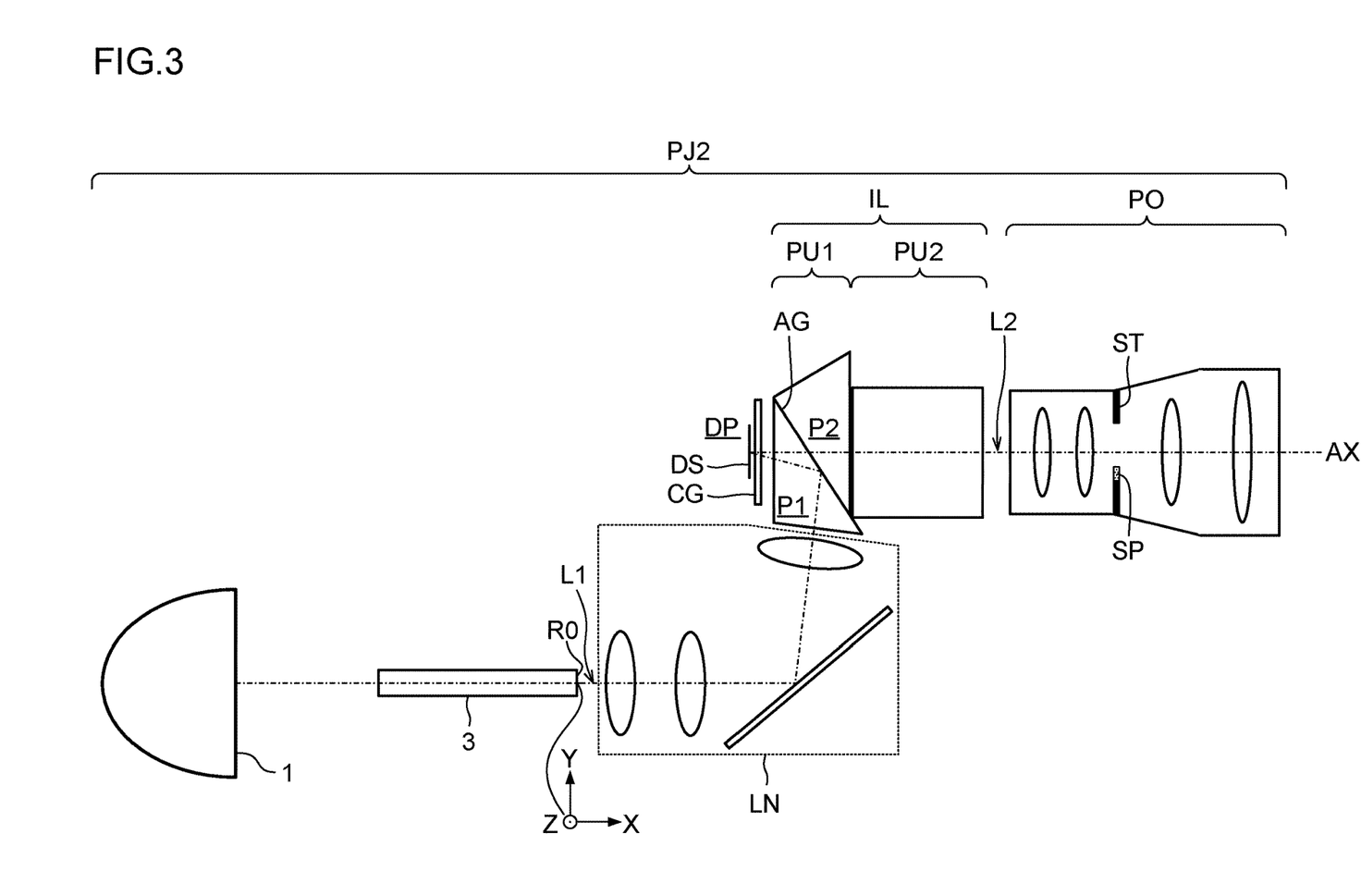
FIG. 3 is a schematic configuration diagram showing one or more embodiments of the projection display apparatus.
Figure 4:
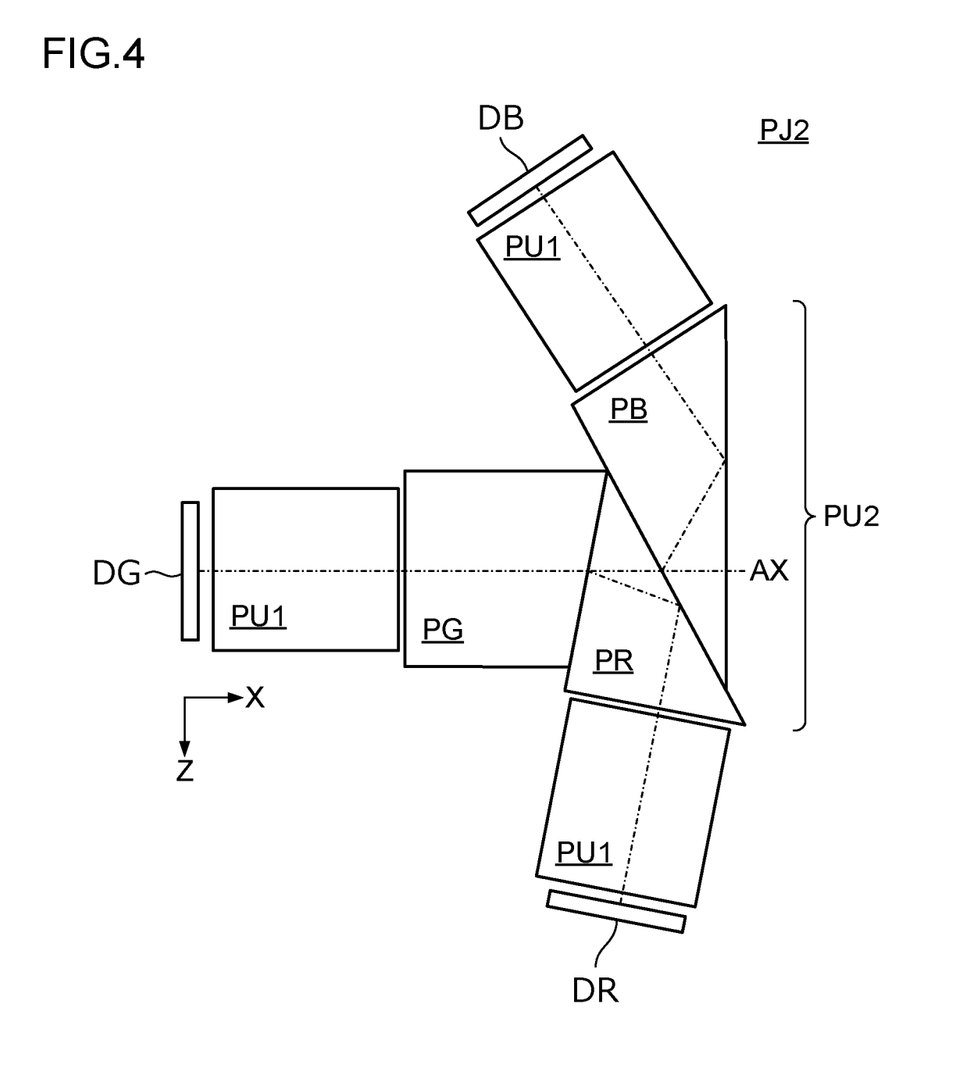
FIG. 4 is a top view showing an example of a principal part of one or more embodiments.
Figure 5:
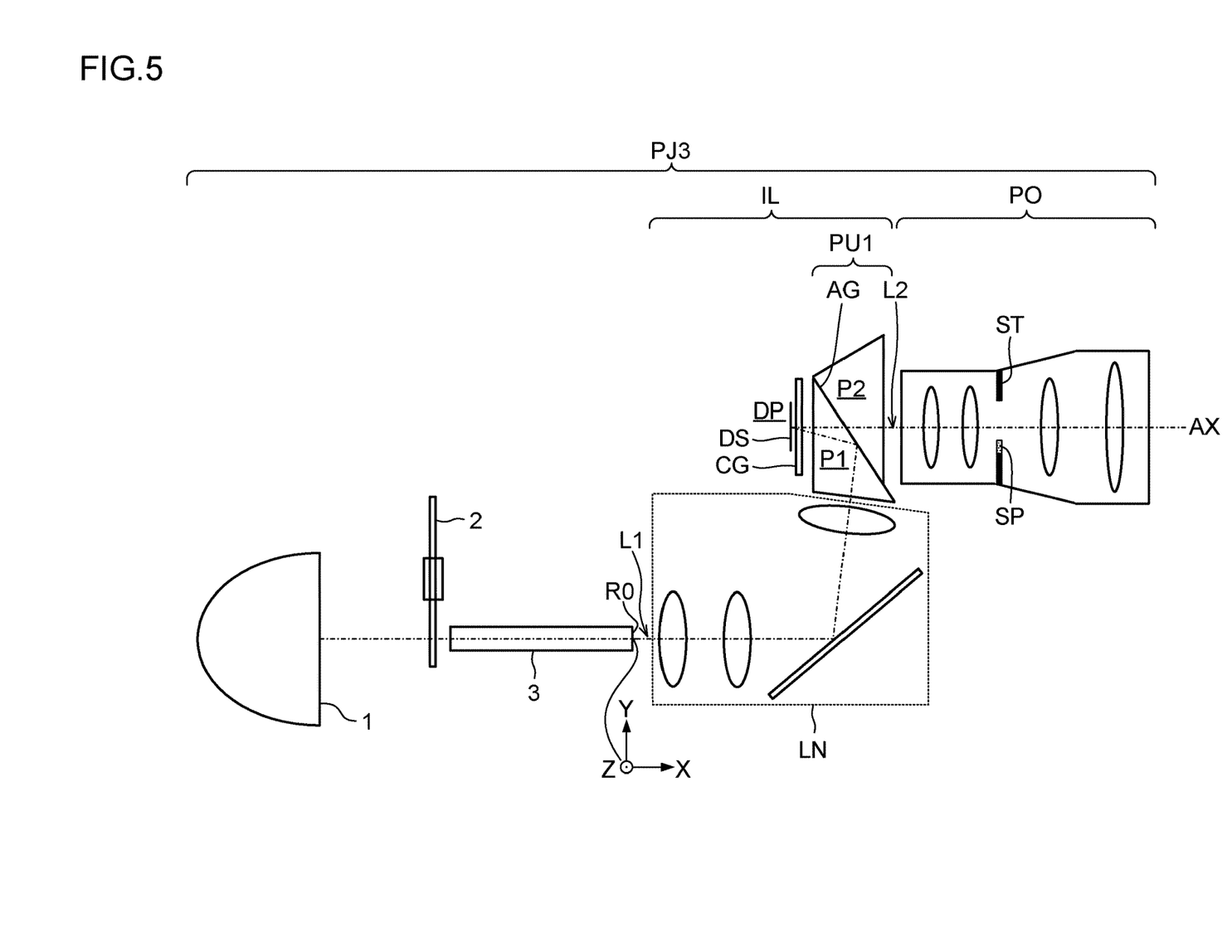
FIG. 5 is a schematic configuration diagram showing one or more embodiments of the projection display apparatus.

FIG. 1 shows a 3-chip projector PJ1 as one or more embodiments of a projection display apparatus, and an example of its principal part is shown in FIG. 2. FIG. 3 shows a 3-chip projector PJ2 as one or more embodiments of the projection display apparatus, and an example of its principal part is shown in FIG. 4. FIG. 5 shows a 1-chip projector PJ3 as one or more embodiments of the projection display apparatus.

In FIG. 1, FIG. 3, and FIG. 5, a global rectangular coordinate system is an absolute coordinate system that coincides with a local rectangular coordinate system (X, Y, Z) having its origin at a center of a rod exit surface R0, where an X direction is a direction parallel to a normal line of the rod exit surface R0, and a Y direction is a direction parallel to a short side of the rod exit surface R0. Accordingly, surfaces of the sheets on which FIG. 1, FIG. 3, and FIG. 5 are drawn each correspond to an XY plane, and surfaces of the sheets on which FIG. 2 and FIG. 4 are drawn each correspond to a ZX plane.

The 3-chip projectors PJ1 and PJ2 (FIG. 1, FIG. 3) are each configured by including a light source device 1, an integral rod 3, an illumination optical system IL, a projection optical system PO, a digital micromirror device DP, and so on. The 1-chip projector PJ3 (FIG. 5) is configured by including a light source device 1, a color wheel 2, an integral rod 3, an illumination optical system IL, a projection optical system PO, a digital micromirror device DP, and so on.

The light source device 1, which generates illumination light L1 in each of the projectors PJ1, PJ2, and PJ3, is a xenon lamp, a laser light source, or the like, for example. The light source device 1 used in each of the projectors PJ1 and PJ3 is a white light source, and the light source device 1 used in the projector PJ2 is a color light source which generates color light in three wavelength bands of R(red), G(green), and B (blue).

The light source device 1 is configured such that a light emission point is located at a focal position of an ellipsoidal reflective surface of a lamp reflector, and converged light emitted from the light source device 1 is directed into the integral rod 3 (FIG. 1, FIG. 3) or the color wheel 2 (FIG. 5). That is, the projectors PJ1 and PJ2 are configured such that the converged light is directed into the integral rod 3, whereas the projector PJ3 is configured such that the converged light is directed into the color wheel 2 and a light beam having passed through the color wheel 2 enters the integral rod 3.

The color wheel 2 mounted on the projector PJ3 is composed of three kinds of color filters which respectively transmit R•G•B light. By rotating the color wheel 2, colors of light for illumination are switched sequentially with time, and by displaying image information corresponding to each color on the digital micromirror device DP, it is possible to color a projected image.

The integral rod 3 assumed here is a light intensity uniformizing element formed as a hollow rod by bonding four flat mirrors together. The illumination light L1 having entered the integral rod 3 through an entrance side end surface (rod entrance surface) undergoes mixing by being repeatedly reflected on side surfaces (that is, inner wall surfaces) of the integral rod 3, as a result of which spatial energy distribution of the illumination light L1 is uniformized, and the resulting illumination light L1 is emitted through an exit side end surface (rod exit surface) R0.

The exit side end surface R0 of the integral rod 3 has a quadrangular shape (which may be rectangular or may be trapezoidal) that is substantially similar in shape to an image display surface DS of the digital micromirror device DP, and further, the exit side end surface R0 of the integral rod 3 is conjugate, or substantially conjugate, to the image display surface DS of the digital micromirror device DP. Hence, the uniform brightness distribution at the exit side end surface R0, which is achieved by the above-described mixing, contributes to efficient and uniform illumination of the digital micromirror device DP.

Here, the integral rod 3 is not limited to a hollow rod, and may instead be a glass rod formed with a glass body having a quadrangular-prism shape. Further, the number of side surfaces of the integral rod 3 is not limited to four but may instead be any suitable number other than four as long as it fits the shape of the image display surface DS of the digital micromirror device DP. That is, the sectional shape of the integral rod 3 is not limited to a quadrangular shape such as a rectangle, a trapezoid, or the like. Thus, examples of the integral rod 3 used here include a hollow tube made by combining a plurality of reflective mirrors, a glass body having a polygonal-prism shape, and the like.

The illumination light L1 having been emitted from the integral rod 3 through the exit side end surface R0 enters the illumination optical system IL. The illumination optical system IL is a catadioptric system which directs incoming illumination light L1 onto the digital micromirror device DP to illuminate its image display surface DS, and includes a condenser lens system LN (which includes a lens element, a flat mirror, and so on) which condenses the illumination light L1, and prism units PU1 and PU2 which perform bending of the optical path of the illumination light L1 and transmission of image light L2. The exit side end surface R0 of the integral rod 3 and the image display surface DS are conjugate, or substantially conjugate, to each other. Note that optical paths in FIG. 1 to FIG. 5 indicate central principal rays of the illumination light L1 and the image light L2 (corresponding to an optical axis AX, and passes through a center of the image display surface DS).

The illumination light L1 having entered the illumination optical system IL is condensed by the condenser lens system LN, and then enters the first prism unit PU1. The first prism unit PU1 is a TIR (total internal reflection) prism including two substantially triangular-prism shaped prisms P1 and P2, and between the prisms P1 and P2, an air gap AG is provided. As will be described later, the air gap AG is tilted at a predetermined angle (90°—G) with respect to a central principal ray L2$p$ (FIG. 7) of the image light L2 emitted from the center of the image display surface DS, and the air gap AG separates from each other the optical paths of the illumination light (input light) L1 and the image light (output light) L2 with respect to the digital micromirror device DP.

In the projector PJ1, the first prism unit PU1 bends the optical path of the illumination light L1 which includes the RGB wavelength bands, and directs the illumination light L1 into the second prism unit PU2. This bending of the optical path is achieved by the illumination light L1 being incident on a tilted surface of the prism P1 forming the air gap AG, at an angle satisfying the total reflection conditions, to be totally reflected on the tilted surface.

The second prism unit PU2 mounted on the projector PJ1 is a color prism for color separation and combination composed of three prisms PR, PG, and PB. For example, as shown in FIG. 2, the illumination light L1 having been emitted from the first prism unit PU1 is separated into the RGB wavelength bands to be respectively directed to enter three digital micromirror devices DR, DG, and DB, and the image light L2, which have respectively been emitted from the digital micromirror devices DR, DG, and DB are combined with each other to be directed into the first prism unit PU1. Then, the image light L2 entering the first prism unit PU1 passes through the air gap AG to be emitted from the first prism unit PU1, and enters the projection optical system PO to be projected onto a screen.

A more detailed description will be given of the color separation and combination performed in the second prism unit PU2. FIG. 2 shows the first and second prism units PU1 and PU2 as seen from an upper side in a direction perpendicular to rotation axes of pixels of the digital micromirror devices DR, DG, and DB. As shown in FIG. 2, the second prism unit PU2 is configured by sequentially combining a blue prism PB and a red prism PR, which are substantially triangular-prism shaped, and a green prism PG, which is block shaped. As the digital micromirror device DP (FIG. 1) which modulates the illumination light L1 on the image display surface DS in accordance with an image signal, the digital micromirror device DR for red, the digital micromirror device DG for green, and the digital micromirror device DB for blue are provided.

Between the blue prism PB and the red prism PR, there are provided a blue dichroic surface which reflects blue light and an air gap layer adjacent to the blue dichroic surface. This air gap layer is tilted with respect to the optical axis AX. Further, between the red prism PR and the green prism PG, there are provided a red dichroic surface which reflects red light and an air gap layer adjacent to the red dichroic surface. This air gap layer also is tilted with respect to the optical axis AX. The air gap layer is tilted in a direction opposite to the direction in which the air gap layer defined by the blue prism PB and the red prism PR is tilted.

In the illumination light L1 having entered the blue prism PB through an entrance-exit surface thereof, blue light is reflected by the blue dichroic surface, but light of the other colors, namely, green light and red light pass through the blue dichroic surface. The blue light reflected by the blue dichroic surface is totally reflected by the entrance-exit surface of the blue prism PB to be then emitted from the blue prism PB through a blue entrance-exit surface, which is a side surface of the blue prism PB, and illuminates the digital micromirror device DB for blue. Of the green light and the red light which have passed through the blue dichroic surface, the red light is reflected by a red dichroic surface, but the green light passes through the red dichroic surface. The red light reflected by the red dichroic surface is totally reflected by the air gap layer adjacent to the blue dichroic surface to be then emitted from the red prism PR through a red entrance-exit surface, which is a side surface of the red prism PR, and illuminates the digital micromirror device DR for red. The green light having passed through the red dichroic surface is emitted from the green prism PG through a green entrance-exit surface, which is a side surface of the green prism PG, and illuminates the digital micromirror device DG for green.

Blue image light L2 reflected from the digital micromirror device DB for blue becomes incident on the blue entrance-exit surface and is totally reflected by the entrance-exit surface of the blue prism PB to be then reflected by the blue dichroic surface. Red image light L2 reflected from the digital micromirror device DR for red becomes incident on the red entrance-exit surface and is totally reflected by the air gap adjacent to the blue dichroic surface to be then reflected by the red dichroic surface, and further passes through the blue dichroic surface. Green image light L2 reflected from the digital micromirror device DG for green becomes incident on the green entrance-exit surface to then pass through the red dichroic surface and the blue dichroic surface.

Then, the image light L2 of the respective colors of red, blue, and green are combined on the same optical axis AX to be emitted from the blue prism PB through the entrance-exit surface of the blue prism PB and then enter the first prism unit PU1. The image light L2 having entered the first prism unit PU1 passes through the air gap AG (FIG. 1), because it does not satisfy the total reflection conditions here, and an image is projected on the screen by the projection optical system PO.

In the projector PJ2, instead of using color-separating prisms, the light source device 1, the integral rod 3, the condenser lens system LN, and the first prism unit PU1 are each provided with respect to each of the RGB wavelength bands. Accordingly, as shown in FIG. 4, for example, three first prism units PU1 respectively bend optical paths of the illumination light L1 separated into the RGB wavelength bands to direct the illumination light L1 respectively onto the three digital micromirror devices DR, DG, and DB. This bending of the optical path is achieved by directing the illumination light L1 to be incident on a tilted surface of the prism P1 forming the air gap AG, at an angle satisfying the total reflection conditions, to be totally reflected thereon.

A second prism unit PU2 mounted on the projector PJ2 is a color prism for color combination composed of three prisms PR, PG, and PB. For example, as shown in FIG. 4, three image light L2 respectively reflected by the three digital micromirror devices DR, DG, and DB to pass through the first prism units PU1 to be emitted therefrom are combined with each other and directed into the projection optical system PO. At this time, the three image light L2 having respectively entered the three first prism units PU1 each pass through the air gap AG to be emitted from the first prism units PU1 to enter the second prism unit PU2. Then, the image light L2 having entered the projection optical system PO is projected onto the screen.

A more detailed description will be given of the color combination performed by the second prism unit PU2. FIG. 4 shows the first and second prism units PU1 and PU2 as seen from an upper side in a direction perpendicular to the rotation axes of pixels of the digital micromirror devices DR, DG, and DB. As shown in FIG. 4, the second prism unit PU2 is configured by sequentially combining a blue prism PB and a red prism PR, which are substantially triangular-prism shaped, and a green prism PG, which is block shaped. As the digital micromirror device DP (FIG. 3) which modulates the illumination light L1 on the image display surface DS in accordance with an image signal, the digital micromirror device DR for red, the digital micromirror device DG for green, and the digital micromirror device DB for blue are provided.

Between the blue prism PB and the red prism PR, there are provided a blue dichroic surface which reflects blue light and an air gap layer adjacent to the blue dichroic surface. This air gap layer is tilted with respect to an optical axis AX. Between the red prism PR and the green prism PG, there are provided a red dichroic surface which reflects red light and an air gap layer adjacent to the red dichroic surface. This air gap layer is also tilted with respect to the optical axis AX. The air gap layer is tilted in a direction opposite to the direction in which the air gap layer defined by the blue prism PB and the red prism PR is tilted.

Blue image light L2 having been reflected from the digital micromirror device DB for blue passes through the first prism unit PU1, becomes incident on a blue entrance surface and is totally reflected by an exit surface of the blue prism PB, and is then reflected by the blue dichroic surface. Red image light L2 having been reflected from the digital micromirror device DR for red passes through the first prism unit PU1, becomes incident on a red entrance surface and is totally reflected by the air gap adjacent to the blue dichroic surface, and is then reflected by the red dichroic surface, to further pass through the blue dichroic surface. Green image light L2 having been reflected from the digital micromirror device DG for green passes through the first prism unit PU1, becomes incident on a green entrance surface, and then passes through the red dichroic surface and the blue dichroic surface.

Then, the image light L2 of the respective colors of red, blue, and green are combined on the same optical axis AX to be emitted from the blue prism PB through the exit surface of the blue prism PB and then enters the projection optical system PO, by which an image is projected onto the screen. Here, the image light L2 respectively reflected from the digital micromirror devices DR, DG, and DB to enter the first prism unit PU1 do not satisfy the total reflection conditions, and thus each pass through the air gap AG (FIG. 3).

In the projector PJ3, the first prism unit PU1 bends the optical path of the illumination light L1, and directs the illumination light L1 to be incident on the digital micromirror device DP. The image light L2 reflected from the digital micromirror device DP to enter the first prism unit PU1 passes through the air gap AG to be emitted from the first prism unit PU1, and enters the projection optical system PO to be projected onto a screen.

Figure 6:
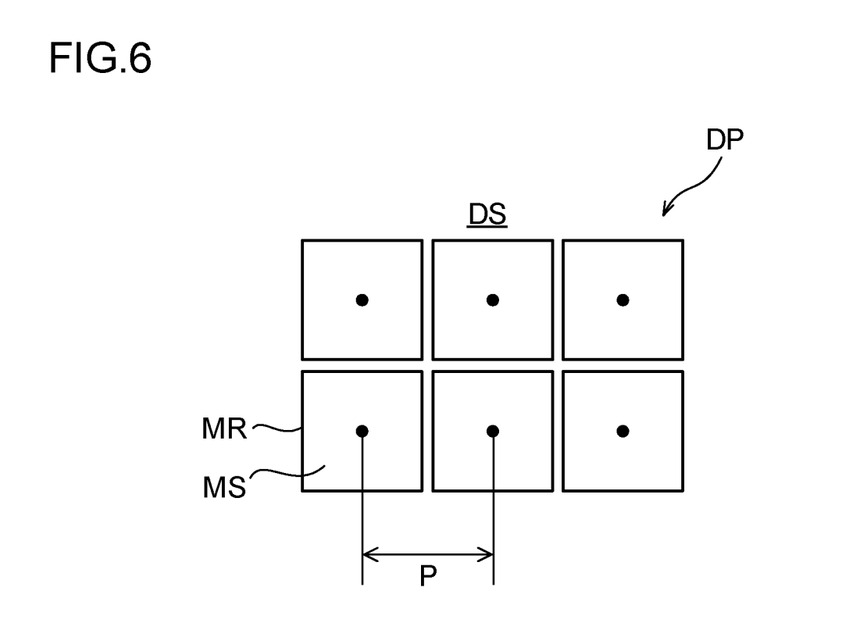
FIG. 6 is a diagram for illustrating a center-to-center distance P between adjacent micromirrors in a digital micromirror device.

The digital micromirror device DP; DR, DG, and DB, is a reflective image display unit which modulates light to thereby generate an image, and configured with an image display surface DS which forms a two-dimensional image by modulating the intensity of the illumination light L1, a cover glass CG placed thereover, and so on. As shown in FIG. 6, for example, the image display surface DS includes a plurality of micromirrors MR, and at the image display surface DS, the tilt of each micromirror surface (pixel reflection surface) MS is subjected to ON/OFF control to modulate the intensity of the illumination light L1, and thereby an image is formed. That is, in the digital micromirror device DP, at the image display surface DS including a plurality of rectangular micromirror surfaces MS, each micromirror surface MS is subjected to ON/OFF control such that each micromirror MR takes two angular states, namely, an image display state (ON state) and an image non-display state (OFF state), and thereby it is possible to modulate the intensity of the illumination light L1 to form a desired image.

In the conventionally well-known digital micromirror device DP; DR, DG, and DB, each pixel has a rotation axis at an angle of 45° with respect to each side of a rectangular image display region constituted of the image display surface DS, and the turning on and off of each pixel is expressed by its rotation about the axis by ±12°, for example. And only light reflected on an on-state micromirror is allowed to pass through the projection optical system PO. On the other hand, in the case of the digital micromirror device DP; DR, DG, and DB, of a new operation type (see Non-Patent Document 1, etc.), the rotation of each mirror surface is not about a single rotation axis, but about two rotation axes perpendicular to each other.

Figure 7:
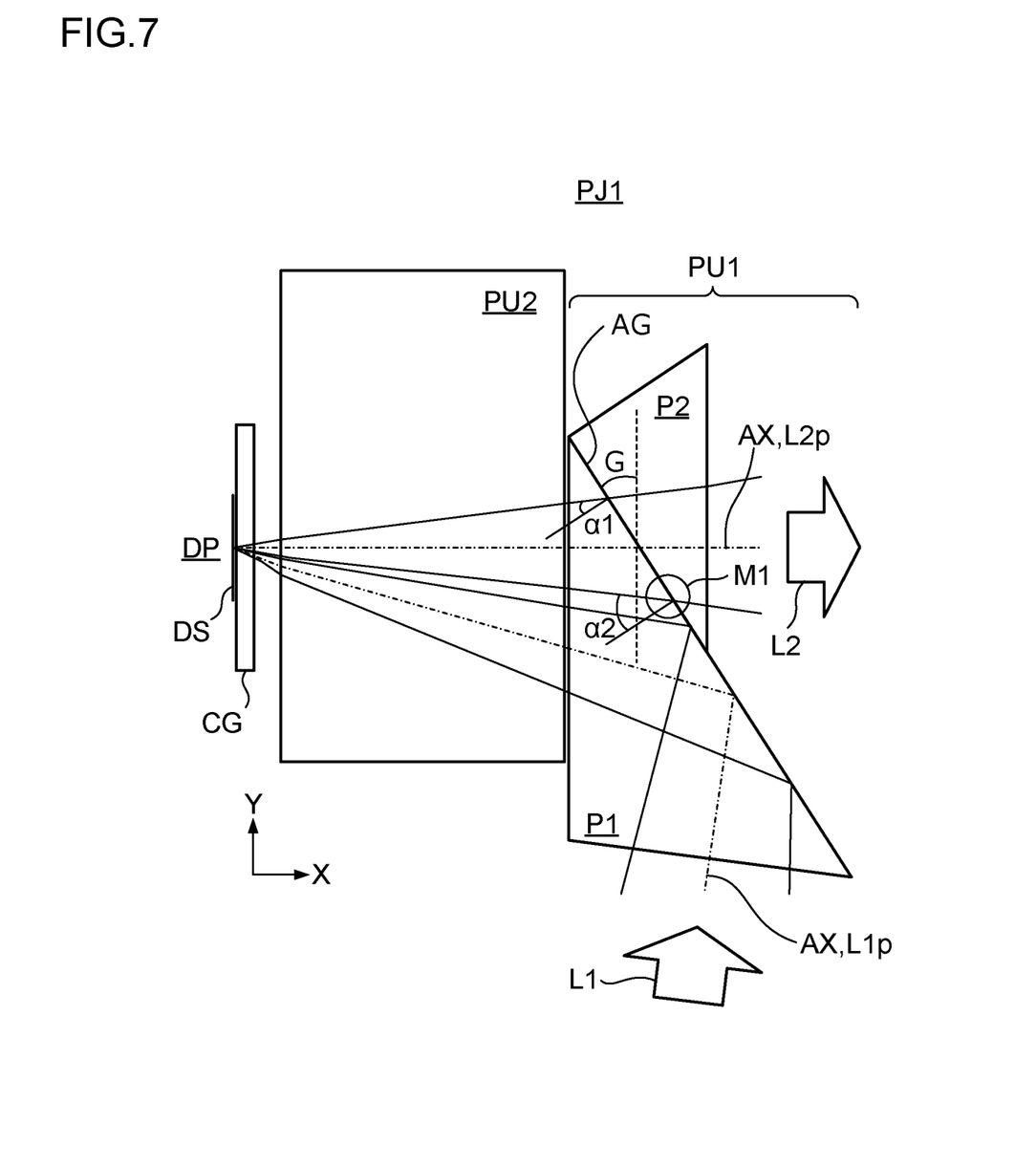
FIG. 7 is an optical path diagram showing how optical paths of illumination light and image light are separated from each other in one or more embodiments.
Figure 8:
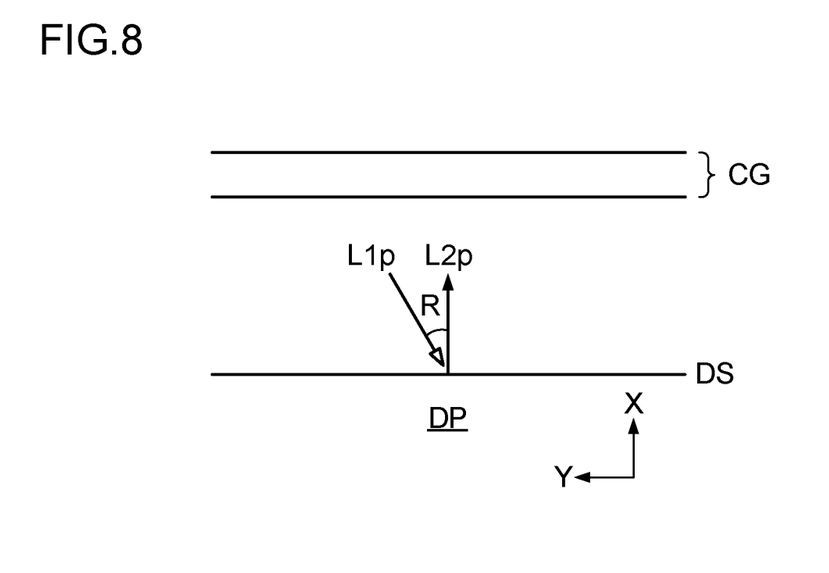
FIG. 8 is a diagram for illustrating a separation angle R between illumination light and image light.

FIG. 7 shows an optical path of an on-axial beam of the image light L2 in the projector PJ1. When the illumination light L1 enters the prism P1, the optical path is bent by total reflection at the air gap AG in the first prism unit PU1. The illumination light L1 is emitted from the prism P1 to be, via the second prism unit PU2, shone onto the image display surface DS of the digital micromirror device DP. When the illumination light L1 is shone onto the image display surface DS of the digital micromirror device DP, the image light L2 resulting from reflection of the illumination light L1 on the illuminate image display surface DS is emitted from the digital micromirror device DP. At this time, as shown in FIG. 8, the image light L2 is separated from the illumination light L1, with a principal ray L2$p$ of the image light L2 immediately after being reflected from the center of the image display surface DS forming an angle R with respect to a principal ray L1$p$ of the illumination light L1 immediately before becoming incident on a center of the image display surface DS.

As shown in FIG. 7, the image light L2, via the second prism unit PU2, passes through the first prism unit PU1. At this time, the image light L2 passes through the air gap AG, which is tilted at an angle G with respect to the optical axis AX to be emitted from the second prism unit PU2 through the prism P2, and enters the projection optical system PO to be projected onto the screen. Here, a lower end of the air gap AG is preferably disposed below a lower-limit position at which the image light L2 is not blocked.

Figure 9:
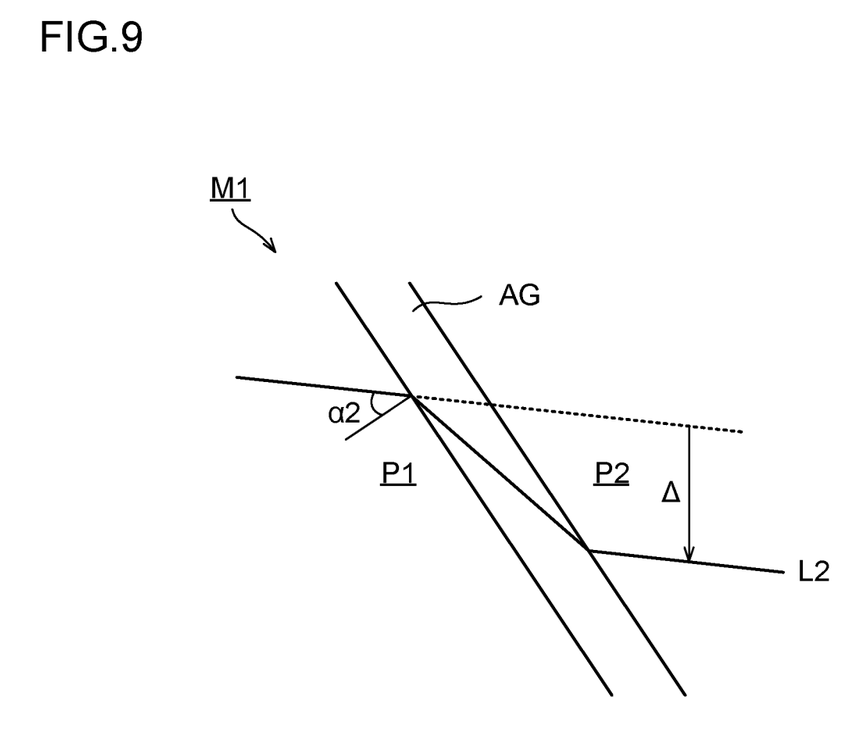
FIG. 9 is an optical path diagram showing a principal part M1 in FIG. 7 in an enlarged manner.

Of the image light L2, a light ray entering the air gap AG at an incidence angle α2 is greatly tilted with respect to the air gap AG, and thus is greatly refracted through the air gap AG. A principal part M1, at which the refraction takes place, is shown in FIG. 9 in an enlarged manner. Of the image light L2, the light ray having entered the air gap AG at the incidence angle α2 is greatly refracted at the air gap AG as is clear from FIG. 9, and a flare component Δ resulting from this refraction causes flare when an image is formed by the projection optical system PO. Here, a direction of the flare component Δ is parallel with respect to a surface of the screen, and the flare is evaluated as a distance on the surface of the screen.

Figure 10:
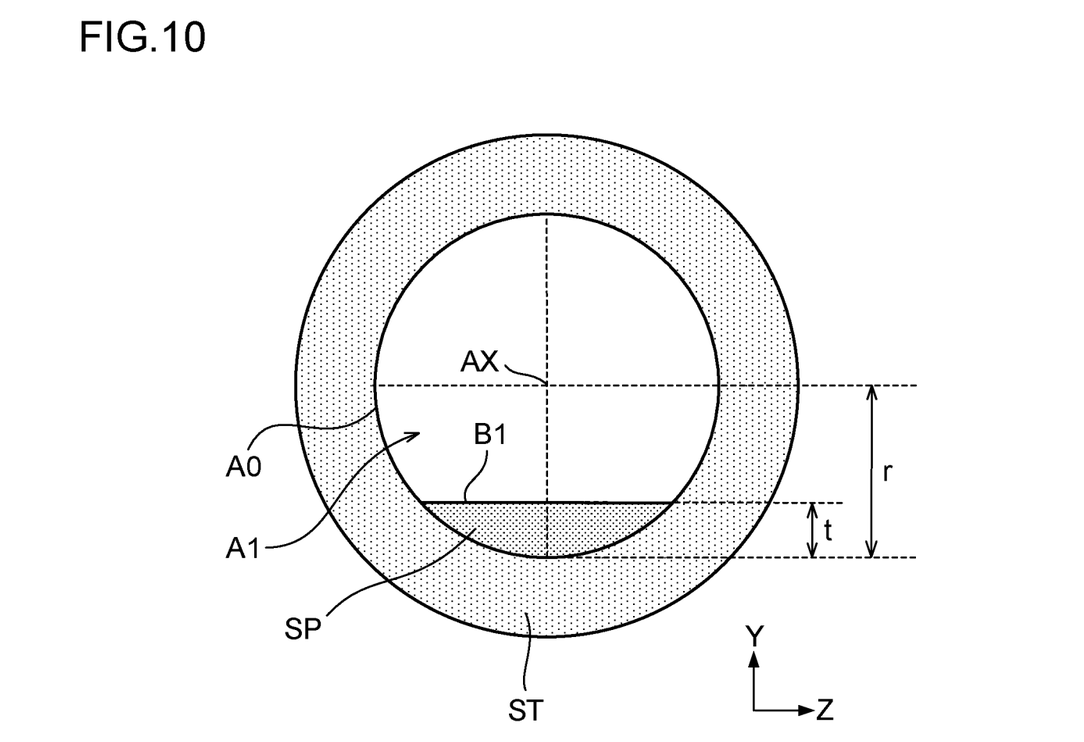
FIG. 10 is a plan view showing an aperture stop having a noncircular aperture.

As shown in FIG. 1, FIG. 3, and FIG. 5, the projection optical system PO is provided with an aperture stop ST having a shade portion SP. As shown in FIG. 10, the aperture stop ST has a noncircular aperture A1, which is so shaped that part of a circular aperture A0 in a peripheral portion thereof is cut off in a shape of a segment to serve as the shade portion SP. And, the image light L2 corresponding to an end portion at a side where the incidence angle with respect to the air gap AG is large (on the incidence angle-α2 side, α1<α2) in an F-number beam is blocked by the shade portion SP. That is, the aperture stop ST of the projection optical system PO is provided with the shade portion SP for the purpose of blocking a light ray in the image light L2 that enters the air gap AG at a large incidence angle α2. Thereby, the flare component Δ (FIG. 9) is blocked, and accordingly, flare in the projected image is eliminated to achieve a high image quality.

The projectors PJ1, PJ2, and PJ3 are each configured to have the above-described distinctive aperture stop ST in the projection optical system PO in order to improve the image quality by blocking the flare component Δ generated in the first prism unit PU1. More specifically, the projectors PJ1, PJ2, and PJ3 are configured to satisfy the following conditional formulae (1) to (3):

$$0.85 \times Cg < G < 1.15 \times Cg \tag{1}$$

$$(0.1 \times T/P - 0.1) < S < (0.4 \times T/P + 0.1) \tag{2}$$

$$(0.25 - 0.07 \times F) < S < (1 - 0.2 \times F) \tag{3}$$

where, assuming that a plane including the principal ray L1$p$ of the illumination light L1 immediately before becoming incident on the center of the image display surface DS and the principal ray L2$p$ of the image light L2 immediately after the reflection is a reference plane (corresponding to an XY plane that is a surface of each of the sheets on which FIG. 1, FIG. 3, FIG. 5, and FIG. 7 are drawn), $$Cg = \arcsin(1/N) - (R - \arcsin(1/(2F)))/N$$

N represents a d-line refractive index of the prism P1 or P2 through which the image light L2 passes, R represents an angle (in degree, and the angle R is shown in FIG. 8) which the principal ray L1$p$ of the illumination light L1 immediately before becoming incident on the center of the image display surface DS and the principal ray L2$p$ of the image light L2 immediately after being reflected on the center of the image display surface DS form therebetween when projected onto the reference plane, F represents a minimum F number of the projection optical system PO, G represents an angle (in degree, and the angle G is shown in FIG. 7) of the air gap AG with respect to a plane perpendicular to the principal ray L2$p$ (the optical axis AX) of the image light L2 emitted from the center of the image display surface DS, T represents an air-gap thickness (in mm), P represents a distance (in mm, and the distance P is shown in FIG. 6) between centers of micromirror surfaces MS located adjacent to each other, and S represents a shading ratio constituting the noncircular aperture A1 of the aperture stop ST, S=t/r (t represents a width of the shade portion SP in a radial direction of the segment, and r represents a radius of the circular aperture A0, both shown in FIG. 10), S>0.

Conditional formula (1) specifies a suitable angle G of the air gap AG, and conditional formulae (2) and (3) specify a suitable size S of the shade portion SP in the aperture stop ST. In conditional formula (2), when each micromirror surface MS constituting one pixel is large, generation of a small flare causes no problem, and when the thickness T of the air gap AG is small, an amount of the flare component Δ generated becomes small. In conditional formula (3), the smaller the F-number is, the larger the shading ratio S becomes.

By the air gap AG, which is provided in the first prism unit PU1 for the purpose of directing the illumination light L1 to the digital micromirror device DP, satisfying conditional formula (1), it is possible for the air gap AG to totally reflect the illumination light L1 and appropriately transmit the image light L2, and thus to achieve maximum light-use efficiency. Further, by providing the aperture stop ST of the projection optical system PO with the shade portion SP that satisfies conditional formulae (2) and (3) (FIG. 1, FIG. 3, FIG. 5, and FIG. 10), it is possible to eliminate the flare component Δ generated in the air gap AG, without losing brightness more than necessary, and thus to achieve an improved image quality.

Below a lower limit of conditional formula (1), the total reflection conditions of the illumination light L1 are not satisfied, and the light-use efficiency tends to be reduced. Above an upper limit of conditional formula (1), a large flare component Δ is generated by the air gap AG, and the image quality tends to be degraded. Below a lower limit of conditional formula (2) or (3), it becomes impossible to fully eliminate the flare component Δ, and the image quality tends to be degraded. Above an upper limit of conditional formula (2) or (3), the image light L2 is blocked more than necessary, and the brightness tends to be reduced.

In relation to conditional formula (1), it is desirable to satisfy conditional formula (1a) below, and it is more desirable to satisfy conditional formula (1b) below:

$$0.9 \times Cg < G < 1.1 \times Cg \quad (1a)$$

$$0.95 \times Cg < G < 1.05 \times Cg \quad (1b)$$

These conditional formulae (1a) and (1b) specify, in the range of the conditions specified by conditional formula (1) described above, a further preferable range of conditions based on the above-described viewpoints, etc. Accordingly, by preferably satisfying conditional formula (1a), and by further preferably satisfying conditional formula (1b), it is possible to further enhance the above-described advantageous effect.

In relation to conditional formula (2), it is desirable to satisfy conditional formula (2a) below:

$$(0.15 \times T/P - 0.15) < S < 0.35 \times T/P \quad (2a)$$

This conditional formula (2a) specifies, in the range of the conditions specified by conditional formula (2) described above, a further preferable range of conditions based on the above-described viewpoints, etc. Accordingly, by preferably satisfying conditional formula (2a), it is possible to further enhance the above-described advantageous effect.

In relation to conditional formula (3), it is desirable to satisfy conditional formula (3a) below:

$$(0.37 - 0.1 \times F) < S < (0.9 - 0.2 \times F) \quad (3a)$$

This conditional formula (3a) specifies, in the range of the conditions specified by conditional formula (3) described above, a further preferable range of conditions based on the above-described viewpoints, etc. Accordingly, by preferably satisfying conditional formula (3a), it is possible to further enhance the above-described advantageous effect.

An example of a configuration that satisfies conditional formulae (1) to (3) is as follows:

N=1.5168,
R=24,
F=2.5,
Cg=33.029,
G=33 (=0.999×Cg),
S=0.3,
T=0.01 mm, and
P=0.01 mm The above data is substituted into conditional formula (1):

$$0.85 \times Cg < G < 1.15 \times Cg$$

as follows:
0.85×33.029<0.999×33.029<1.15×33.029, and
0.85<0.999<1.15.

Likewise, the above data is substituted into conditional formulae (1a) and (1b) as follows:
0.9<0.999<1.1, and
0.95<0.999<1.05.

The above data is substituted into conditional formula (2):

$$(0.1 \times T/P - 0.1) < S < (0.4 \times T/P + 0.1)$$

as follows:
(0.1×0.01/0.01−0.1)<S<0.4×0.01/0.01+0.1, and
0<0.3<0.5.

Likewise, the above data is substituted into conditional formula (2a) as follows:
0<0.3<0.35.

The above data is substituted into conditional formula (3):

$$(0.25 - 0.07 \times F) < S < (1 - 0.2 \times F),$$

as follows:
(0.25−0.07×2.5)<0.3<(1−0.2×2.5), and
0.075<0.3<0.5.

Likewise, the above data is substituted into conditional formula (3a) as follows:
(0.37−0.1×2.5)<0.3<(0.9−0.2×2.5), and
0.12<0.3<0.4.

The above-described projectors PJ1, PJ2, and PJ3 each include the digital micromirror device DP which converts the illumination light L1 into the image light L2 by reflection on the image display surface DS and emits the image light L2, the first prism unit PU1 which performs the bending of the optical path of the illumination light L1 and the transmission of the image light L2, and the projection optical system PO which projects the image light L2 having passed through the first prism unit PU1 onto the screen. And, the projectors PJ1, PJ2, and PJ3 are each configured such that the first prism unit PU1 has the air gap AG tilted at a predetermined angle (90°—G) with respect to the principal ray L2p of the image light L2 emitted from the center of the image display surface DS, the image light L2 passes through the air gap AG, the projection optical system PO has the aperture stop ST with the noncircular aperture A1 so shaped that part of the circular aperture A0 in a peripheral portion thereof is cut off in a shape of a segment to serve as the shade portion SP, and the image light L2 corresponding to an end portion at a side where the incidence angle with respect to the air gap AG is large in the F-number beam is blocked by the shade portion SP. According to this configuration, it is possible to block the flare component Δ generated when the image light L2 passes through the air gap AG by means of the distinctive aperture stop ST provided in the projection optical system PO, to thereby achieve an improved image quality. Accordingly, it is possible to achieve a higher resolution while maintaining brightness.

The 3-chip projector PJ1 is provided with the digital micromirror devices DR, DG, and DB (FIG. 2) respectively for the plurality of wavelength bands RGB, and includes, as prism units, the first prism unit PU1 which bends the optical path of the illumination light L1 including the plurality of wavelength bands RGB, and the second prism unit PU2 (a color prism for color separation and combination) which separates the illumination light L1 which has been emitted from the first prism unit PU1 into the plurality of wavelength bands RGB to be respectively directed onto the plurality of digital micromirror devices DR, DG, and DB, and combines the image light L2 which have been emitted from the digital micromirror devices DR, DG, and DB with each other to be directed into the first prism unit PU1. And, the 3-chip projector PJ1 is configured such that the first prism unit PU1 has the air gap AG which is tilted at the predetermined angle (90°—G) with respect to the principal ray L2$p$ of the image light L2 emitted from the center of the image display surface DS, and the image light L2 having entered the first prism unit PU1 passes through the air gap AG to be emitted from the first prism unit PU1 to enter the projection optical system PO. According to this configuration, it is possible to block the flare component Δ generated in the air gap AG, which is provided for totally reflecting the illumination light L1, by means of the distinctive aperture stop ST having the shade portion SP, to thereby achieve an improved image quality. Accordingly, it is possible to achieve a higher resolution while maintaining brightness.

The 3-chip projector PJ2 is provided with the digital micromirror devices DR, DG, and DB (FIG. 4) respectively for the plurality of wavelength bands RGB, and includes, as prism units: the plurality of first prism units PU1 which respectively bend the optical paths of the plurality of illumination light L1 separated into the plurality of wavelength bands RGB and direct the plurality of illumination light L1 respectively onto the plurality of digital micromirror devices DR, DG, and DB; and the second prism unit PU2 (a color prism for color combination) which combines with each other the plurality of image light L2, which have respectively been reflected from the plurality of digital micromirror devices DR, DG, and DB to respectively pass through the first prism units PU1 to be emitted therefrom, to be directed into the projection optical system PO. And, the 3-chip projector PJ2 is configured such that the plurality of first prism units PU1 each have the air gap AG tilted at the predetermined angle (90°—G) with respect to the principal ray L2$p$ of the image light L2 emitted from the center of the image display surface DS, and the image light L2 which have respectively entered the plurality of first prism units PU1 pass through the air gap AG to be respectively emitted from the plurality of first prism units PU1 to enter the second prism unit PU2. According to this configuration, it is possible to block the flare component Δ generated in the air gap AG, which is provided for totally reflecting the illumination light L1, by means of the distinctive aperture stop ST having the shade portion SP, to thereby achieve an improved image quality. Accordingly, it is possible to achieve a higher resolution while maintaining brightness.

It is preferable that a boundary B1 (FIG. 10) between the noncircular aperture A1 and the shade portion SP in the aperture stop ST correspond to a chord of the segment and be a straight line perpendicular to the reference plane (corresponding to the XY plane which is the surface of the sheet on which each of FIG. 1, FIG. 3, FIG. 5, and FIG. 7 are drawn). The boundary B1 formed as such a straight line is effective in cutting the flare component Δ as much as possible and minimizing the reduction of brightness.

Although embodiments of the present invention have been described and illustrated in detail, the disclosed embodiments are made for purposes of illustration and example only and not limitation. The scope of the present invention should be interpreted by terms of the appended claims.

LIST OF REFERENCE SIGNS

PJ1, PJ2, PJ3 projector (projection display apparatus)
IL illumination optical system
LN condenser lens system
PU1 first prism unit
PU2 second prism unit
PR red prism
PG green prism
PB blue prism
P1, P2 prism
AG air gap
DP digital micromirror device (reflective image display element)
DR digital micromirror device (reflective image display element) for red
DG digital micromirror device (reflective image display element) for green
DB digital micromirror device (reflective image display element) for blue
DS image display surface
MR micromirror
MS micromirror surface
L1 illumination light
L2 image light
L1$p$, L2$p$ central principal ray
PO projection optical system
ST aperture stop
SP shade portion
A0 circular aperture
A1 noncircular aperture
B1 boundary
XY reference plane
AX optical axis
1 light source device
2 color wheel
3 integral rod
R0 rod exit surface

The invention claimed is:

1. A projection display apparatus comprising:
a reflective image display element that converts illumination light into image light by reflection on an image display surface and emits the image light;
a prism unit that bends an optical path of illumination light and transmits the image light; and
a projection optical system that projects the image light that passed through the prism unit onto a screen,
wherein
the image display surface comprises a plurality of micromirrors, and an image is formed by modulating an intensity of illumination light by controlling a tilt of each micromirror surface in the image display surface,
the prism unit comprises an air gap tilted at a predetermined angle with respect to a principal ray of the image light emitted from a center of the image display surface, and the image light passes through the air gap,
the projection optical system comprises an aperture stop with a circular aperture and
a noncircular aperture having a shape of a segment of the circular aperture and that serves as a shade portion, and the image light corresponding to an end portion at a side where an incidence angle with respect to the air gap is large in an F-number beam is blocked by the shade portion, and
conditional formulae (1) to (3) below are satisfied:

$$0.85 \times Cg < G < 1.15 \times Cg \tag{1}$$

$$(0.1 \times T/P - 0.1) < S < (0.4 \times T/P + 0.1) \tag{2}$$

$$(0.25 - 0.07 \times F) < S < (1 - 0.2 \times F) \tag{3}$$

where, assuming that a plane including a principal ray of illumination light immediately before becoming incident on the center of the image display surface and a principal ray of the image light immediately after the reflection is a reference plane, $$Cg=\arcsin(1/N)-(R-\arcsin(1/(2F)))/N,$$

N represents a d-line refractive index of a prism through which the image light passes, R represents an angle (in degrees) on the reference plane between a principal ray of illumination light immediately before becoming incident on the center of the image display surface and a principal ray of the image light immediately after being reflected on the center of the image display surface, F represents a minimum F-number of the projection optical system, G represents an angle (in degrees) of an air gap with respect to a plane perpendicular to a principal ray of the image light emitted from the center of the image display surface, T represents an air-gap thickness (in mm), P represents a distance (in mm) between centers of micromirror surfaces located adjacent to each other, and S represents a shading ratio constituting the noncircular aperture of the aperture stop (S=[a width of the shade portion in a radial direction of the segment]/[a radius of the circular aperture]), wherein S>0.

2. The projection display apparatus according to claim 1, wherein
a boundary between the noncircular aperture and the shade portion in the aperture stop corresponds to a chord of the segment and is a straight line perpendicular to the reference plane.

3. A projection display apparatus comprising:
a reflective image display unit that converts illumination light into image light by reflection on an image display surface and emits the image light;
a prism unit that bends an optical path of illumination light and transmits the image light; and
a projection optical system that projects the image light that passed through the prism unit onto a screen,
wherein
the reflective image display, unit comprises a plurality of image display elements provided for each of a plurality of wavelength bands,
the prism unit comprises:
a first prism that bends an optical path of illumination light including the plurality of wavelength bands, and
a second prism that separates illumination light emitted from the first prism into the plurality of wavelength bands to be respectively directed onto the plurality of image display elements, and combines the image light emitted from the image display elements with each other to be directed into the first prism,
the first prism comprises an air gap tilted at a predetermined angle with respect to a principal ray of the image light emitted from a center of the image display surface,
the image light that entered the first prism passes through the air gap to be emitted from the first prism to enter the projection optical system, and
the projection optical system comprises an aperture stop with a circular aperture and
a noncircular aperture having a shape of a segment of the circular aperture and that serves as a shade portion, and the image light corresponding to an end portion at a side where an incidence angle with respect to the air gap is large in an F-number beam is blocked by the shade portion.

4. A projection display apparatus comprising:
a reflective image display unit that converts illumination light into image light by reflection on an image display surface and emits the image light;
a prism unit that bends an optical path of illumination light and transmits the image light; and
a projection optical system that projects the image light that passed through the prism unit onto a screen,
wherein
the reflective image display unit comprises a plurality of image display elements provided for each of a plurality of wavelength bands,
the prism unit comprises:
a plurality of first prisms that respectively bend optical paths of a plurality of illumination light separated into the plurality of wavelength bands and direct the plurality of illumination light respectively onto the plurality of image display elements, and
a second prism that combines with each other a plurality of image light reflected from the plurality of image display elements to respectively pass through the plurality of first prisms to be emitted therefrom, to be directed into the projection optical system,
the plurality of first prisms each comprise an air gap tilted at a predetermined angle with respect to a principal ray of the image light emitted from a center of the image display surface,
the image light that respectively entered the plurality of first prisms passes through the air gap to be emitted from the plurality of first prisms to enter the second prism, and
the projection optical system comprises an aperture stop with a circular aperture and
a noncircular aperture having a shape of a segment of the circular aperture and that serves as a shade portion, and the image light corresponding to an end portion at a side where an incidence angle with respect to the air gap is large in an F-number beam is blocked by the shade portion.

* * * * *